US009910872B2

(12) United States Patent
Smith

(10) Patent No.: US 9,910,872 B2
(45) Date of Patent: *Mar. 6, 2018

(54) GRID BASED DATA MOBILITY

(71) Applicant: International Business Machines Corporation, Armonk, NY (US)

(72) Inventor: Ian T. Smith, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/159,881

(22) Filed: May 20, 2016

(65) Prior Publication Data

US 2016/0267080 A1  Sep. 15, 2016

Related U.S. Application Data

(63) Continuation of application No. 13/914,728, filed on Jun. 11, 2013, now Pat. No. 9,396,219.

(30) Foreign Application Priority Data

Aug. 7, 2012 (GB) .................................. 1214119.8

(51) Int. Cl.
G06F 17/30 (2006.01)
G06F 3/06 (2006.01)
H04L 29/08 (2006.01)

(52) U.S. Cl.
CPC ............ G06F 17/303 (2013.01); G06F 3/067 (2013.01); G06F 3/0607 (2013.01);
(Continued)

(58) Field of Classification Search
CPC ............ G06F 17/303; G06F 17/30377; G06F 17/30685; G06F 17/30477; G06F 17/30365
(Continued)

(56) References Cited

U.S. PATENT DOCUMENTS 7,130,970 B2   10/2006  Devassy et al.
7,246,207 B2    7/2007  Kottomtharayil et al.
(Continued)

FOREIGN PATENT DOCUMENTS

CN  101493797 A   7/2009
EP    1786142 A1  5/2007
GB    2504719 A   2/2014

OTHER PUBLICATIONS

CN Office Action, dated Sep. 27, 2016, Application No. 201310341785.4, 8 pages.
(Continued)

*Primary Examiner* — Jessica N Le
(74) *Attorney, Agent, or Firm* — L. Jeffrey Kelly

(57) ABSTRACT

A data migration system and method are disclosed for migrating data from a source server to a target server. The system includes an index containing a plurality of data migration operations in a normalized data model, each data migration operation being stored in association with an attribute, and a data mover communicably connected to the index. The data mover is adapted to move data from the source server to the target server in accordance with the data migration operations contained in the index. The data mover has an attribute corresponding to the associated attribute of at least one data migration operation contained in the index, the attribute indicating the type of data migration operations that can be performed by the data mover.

14 Claims, 5 Drawing Sheets

(52) U.S. Cl.
CPC .......... *G06F 3/0613* (2013.01); *G06F 3/0647* (2013.01); *G06F 17/30365* (2013.01); *G06F 17/30377* (2013.01); *G06F 17/30477* (2013.01); *H04L 67/10* (2013.01)

(58) Field of Classification Search
USPC ........................................................ 707/609
See application file for complete search history.

(56) References Cited

U.S. PATENT DOCUMENTS

| | | |
|---|---|---|
| 7,346,623 B2 | 3/2008 | Prahlad et al. |
| 7,395,282 B1 | 7/2008 | Crescenti et al. |
| 7,454,569 B2 | 11/2008 | Kavuri et al. |
| 7,584,227 B2 | 9/2009 | Gokhale et al. |
| 7,613,752 B2 | 11/2009 | Prahlad et al. |
| 7,620,710 B2 | 11/2009 | Kottomtharayil et al. |
| 7,657,550 B2 | 2/2010 | Prahlad et al. |
| 7,660,807 B2 | 2/2010 | Prahlad et al. |
| 7,747,579 B2 | 6/2010 | Prahlad et al. |
| 7,849,059 B2 | 12/2010 | Prahlad et al. |
| 8,271,548 B2 | 9/2012 | Prahlad et al. |
| 8,572,330 B2 | 10/2013 | Kottomtharayil et al. |
| 2006/0026012 A1 | 2/2006 | Campbell |
| 2006/0129771 A1 | 6/2006 | Dasgupta et al. |
| 2006/0143239 A1 | 6/2006 | Battat et al. |
| 2007/0260834 A1 | 11/2007 | Kavuri et al. |
| 2008/0307527 A1* | 12/2008 | Kaczmarski ........ G06F 11/1458 726/24 |
| 2010/0005151 A1 | 1/2010 | Gokhale |
| 2010/0145929 A1 | 6/2010 | Burger et al. |
| 2010/0191884 A1 | 7/2010 | Holenstein et al. |
| 2012/0030247 A1* | 2/2012 | Yambal ............. G06F 17/30079 707/802 |
| 2012/0101995 A1* | 4/2012 | Agetsuma ............. G06F 3/0605 707/644 |
| 2012/0102280 A1* | 4/2012 | Nasu ................... G06F 11/1453 711/162 |
| 2014/0046898 A1 | 2/2014 | Smith |

OTHER PUBLICATIONS

Pending DE Application No. 102013215008.3, filed on Jul. 31, 2013, entitled: "Grid Based Data Mobility", 21 pages.

Pending U.S. Appl. No. 15/150,729, filed May 10, 2016, entitled: "Grid Based Data Mobility", 24 pages.

Pending U.S. Appl. No. 15/157,450, filed May 18, 2016, entitled: "Grid Based Data Mobility", 24 pages.

* cited by examiner

GRID BASED DATA MOBILITY

The present application is a continuation of U.S. patent application Ser. No. 13/914,728, filed Jun. 11, 2013 which in turn claims priority to United Kingdom Patent Application Serial Number 1214119.8 entitled "GRID BASED DATA MOBILITY", filed Aug. 7, 2012 with the United Kingdom Intellectual Property Office, the contents of each application identified above are incorporated by reference herein in its entirety.

BACKGROUND

Field of the Invention

The invention relates to a system and process for moving data from a source server to a target server in a more scalable and flexible manner.

Background of Invention

The migration of large volumes of data between different physical systems and data models is becoming progressively more important to industry. Such migrations may be necessary to move data from legacy hardware or data models that are now obsolete. Migrations are also necessary to provide backup of data or to move data to a more accessible physical location.

Data migration has previously been performed using labor-intensive manual data collection and transformation processes that must be tailored to each individual migration. This has made the process expensive, slow and prone to error.

Any type of data mobility operation involves a high number of source and target resources that must be manipulated to maximize the efficiency of the data movement and reduce the overall duration of the operation. Large data infrastructures are built to provide for many users accessing the data and creating new data in a storage infrastructure.

Data migration operations tend to be a single thread, in contrast to the above multiple thread infrastructures. This single-thread operation does not fully optimize the source infrastructure asset to enable a fast and efficient data movement.

SUMMARY

According to an aspect of the invention, there is provided a data migration system for migrating data from a source server to a target server, including: an index containing a plurality of data migration operations in a normalized data model, each data migration operation being stored in association with an attribute; and a data mover communicably connected to the index, the data mover being adapted to move data from the source server to the target server in accordance with the data migration operations contained in the index; wherein: the data mover has an attribute corresponding to the associated attribute of at least one data migration operation contained in the index, the attribute indicating the type of data migration operations that can be performed by the data mover; the index is adapted to acquire the attribute of the data mover and to transmit to the data mover a data migration operation having the attribute corresponding to the attribute of the data mover from among the data migration operations contained in the index; and the data mover is adapted to move data from the source server to the target server in accordance with the transmitted data migration operation.

The present invention provides a logic mechanism that allows the massive scalability of data mobility and data movement operations by the use of a central job repository and abstracted data mover applications.

To enable many threads of data migration operations, the present inventors realized that many abstracted data movers may be used to facilitate many requests to the source infrastructure. This structure effectively drives up aggregate throughput. However, multiple data movers may not always be required and the appropriate number of data movers will vary between migrations. The system of the present invention allows data movers to be added to and removed from the system as required, so that the throughput of the system can be matched to its workload.

Preferably, the data mover includes a data extraction command generation engine adapted to generate a data extraction command in a source language of the source server from the transmitted data migration operation. Suitably, the data mover includes a data commit command generation engine adapted to generate a data commit command in a target language of the target server from the transmitted data migration operation.

Preferably, the data mover is adapted to send a completion report to the index after the transmitted data migration operation is completed.

Suitably, the index is adapted to determine whether all data migration operations having the attribute corresponding to the attribute of the data mover have been completed in a current phase of data migration, after the transmitted data migration operation is completed; and if not all data migration operations having the attribute have been completed in the current phase of data migration then the index is adapted to transmit another data migration operation having the attribute from among the data migration operations contained in the index; and if all data migration operations having the attribute have been completed in the current phase of data migration then the index is adapted to instruct the data mover to enter a paused state.

More preferably: the data mover has a plurality of attributes and each data migration operation is associated with a plurality of attributes; the attributes of the data mover correspond to the attributes of at least one data migration operation contained in the index; and the index is adapted to transmit to the data mover a data migration operation having attributes corresponding to the attributes of the data mover from among the data migration operations contained in the index.

Suitably, the system includes a plurality of data movers having different attributes, wherein the index distributes data migration operations to data movers having attributes respectively matching those of the data migration operations.

The inventors have discovered that the added complexity associated with using multiple data movers, which is due to the management and configuration of many elements, avoiding contention and avoiding repeated operations, is greatly outweighed by the increase in aggregate throughput provided by the invention.

According to another aspect of the invention, there is provided a method for migrating data from a source server to a target server, including: storing a set of data migration operations in a normalized data model in an index, each data migration operation being stored in association with an attribute; storing an attribute in a data mover communicably connected to the index, the attribute indicating the type of data migration operations that can be performed by the data mover; acquiring the attribute stored in the data mover at the index; transmitting from the index to the data mover a data migration operation having an associated attribute corresponding to the attribute stored in the data mover; converting the data migration operation into a data extraction command in a source language of the source server; transmitting the data extraction command to the source server; converting the data migration operation into a data commit command in a target language of the target server; transmitting the data commit command to the target server; and moving data from the source server to the target server.

Preferably, a plurality of data movers having different attributes are connected to the index, the method further including: estimating the time required to complete movement of the data from the source server to the target server; and connecting an additional data mover to the index or activating an additional data mover if the estimated time exceeds a predetermined upper threshold.

Suitably, a plurality of data movers having different attributes are connected to the index, the method further including: estimating the time required to complete movement of the data from the source server to the target server; and disconnecting a data mover from the index or deactivating a data mover if the estimated time falls below a predetermined lower threshold.

BRIEF DESCRIPTION OF THE SEVERAL VIEWS OF THE DRAWINGS

The following detailed description, given by way of example and not intended to limit the invention solely thereto, will best be appreciated in conjunction with the accompanying drawings, in which.

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Figure 1:
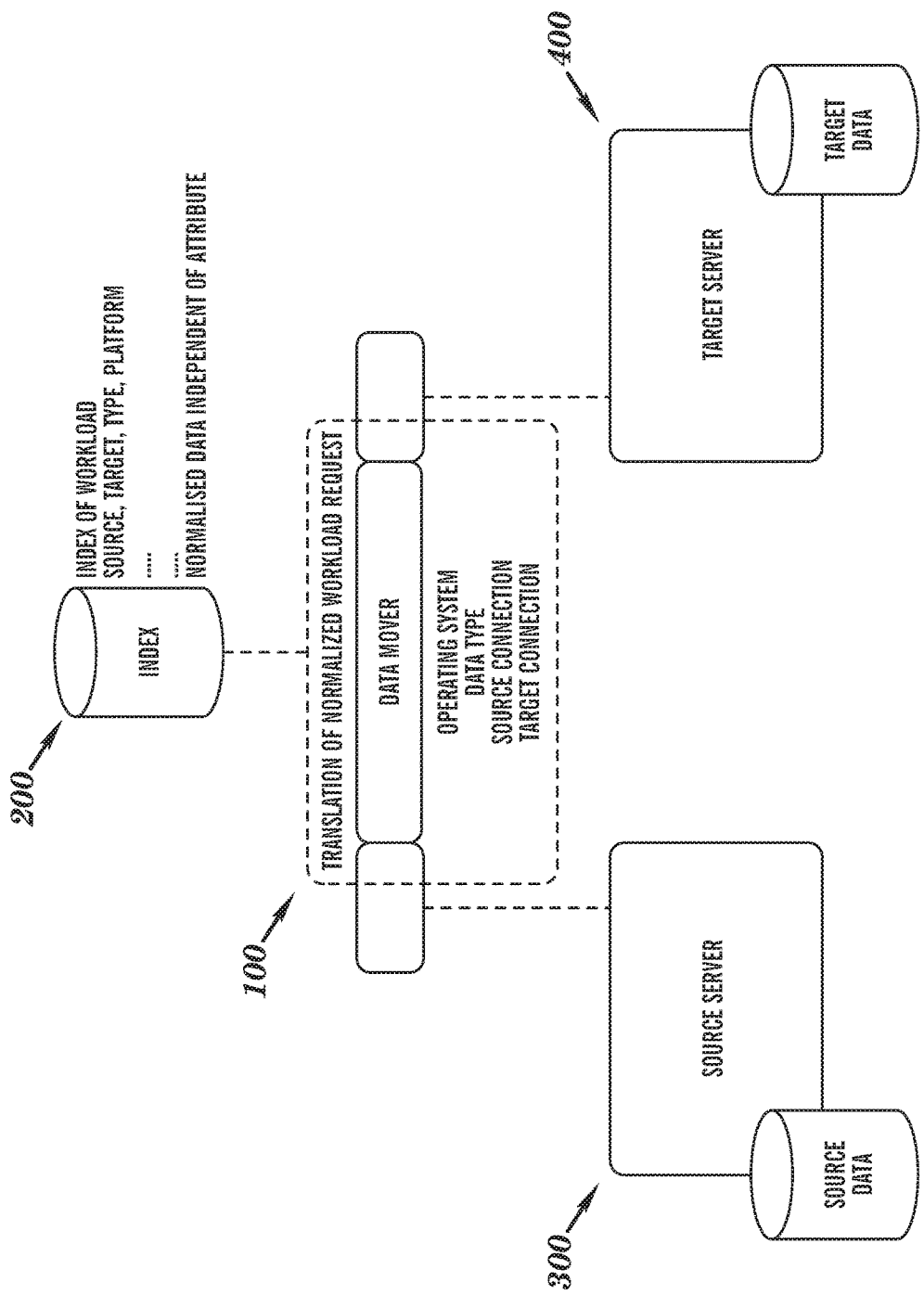
FIG. 1 illustrates a data migration system according to an embodiment of the invention.

FIG. 1 provides an overview of an index-data mover relationship according to an embodiment of the invention.

With reference to FIG. 1, the source server 300 contains source data, which is to be migrated to target data in the target server 400.

The index 200 contains an index of the source data in the source server 300. The index 200 uses a normalized data model that is independent of the format in which data is actually held in the source server 300. The index 200 is generated using automated data collectors and importers.

The data mover 100 is a component that moves data from the source server 300 to the target server 400 based on the information about the source data contained in the index 200. The system may contain any number of data movers 100. The data mover 100 takes a normalized workload from the index 200. The term "normalized" means that all data in the index 200 conforms to a single standard data model, which is understood by the data movers 100. In other words, the index 200 is agnostic to the format and type of data held in the source and target servers. The index 200 is unaffected by the specific database products used on the source and target servers. All product-specific translation and management is conducted on the data mover 100.

In this embodiment of the invention, the index 200 is a central index which stores all required data movement operations. These have been mathematically created and processed, each with a number of attributes such as source location, target destination, platform type and data type. These attributes are tagged to every migration operation, meaning that there is metadata controlling each data operation. The migration operations are then entered as eligible operations on the central index 200, effectively marking each migration operation as a piece of work that should be completed if the data mover 100 aligns with the required attributes for that particular migration operation.

For example, a data migration operation may be stored in the index 200 having the following attributes: Source A, Target B, Type C and Platform D. Many data movers 100 may be provided, only a subset of which have the attributes Source A, Target B, Type C and Platform D. Any one of that subset of data movers may perform the data migration operation. The data mover 100 can be pre-configured with the attributes in a control file, or the configuration of the attributes of the data mover 100 can be completed by the central index 200.

This allows a many data mover 100 to one index 200 relationship. As new data movers communicate with the central index 200 and make themselves available for work, migration operations are allocated to the data mover 100. The data mover 100 on connection automatically registers itself with the associated attributes, if these match migration operations with the equivalent attributes then those migration operations are made available to be allocated to the data mover 100.

Once the migration operations are allocated to the data mover 100, the data mover 100 has no further reliance on the central index 200 other than pushing progress and success reports to the index 200 to ensure that the central index 200 is aware of the completion of all operations. The data mover 100 secures the source and target point relationships with the associated infrastructure, i.e. the connections between the data mover 100 and the source server 300 and between the data mover 100 and the target server 400. The data mover 100 also handles all translation of required operations to the languages of the source and target servers, referred to as the source and target languages.

In other words, the central index 200 stores an array of migration operations in a normalized data model. Each data mover 100 converts migration operations having attributes matching its own into the appropriate source and target languages depending on its attributes. For example, the data mover 100 described above would produce a request to retrieve data in the language of source A based on the entry for the data migration operation in the index 200 and send the request to the appropriate source server A, to which the data mover 100 is connected. The data mover 100 thereby retrieves the relevant data from the source server 300.

Subsequently, the data mover 100 would generate a request to commit, i.e. upload data in the language of target B, again based on the entry for the data migration operation in the index 200. This request is sent to target server B to which the data mover 100 is connected and the relevant data is thereby committed in the appropriate format for target server B.

Typically, each data mover 100 has translation logic for converting a data migration operation in the normalized data model, i.e. language, of the index 200 to requests in the languages of one or more particular source servers and one or more particular target servers respectively. The translation logic constitutes data extraction command generation and data commit command generation engines. As a result, the index only needs to ensure that the data migration operations are sent to appropriate data movers to ensure that the operations are translated into the correct languages.

Once each data mover 100 has completed the current migration operation, then it can either take additional workload or pause its operation and be removed from the active configuration. This optional pausing of data movers ensures that the aggregate capability can be flexed as the source environment is reduced through data migration.

As the central index 200 holds normalized, common attributes for each migration operation, the scale out capability of the data movers is the number of individual attribute profiles and the number of migration operations within the index 200.

The enhanced scalability of the system of the embodiment is due to the fact that the data movers are all independent automated components having well defined attributes. This means that additional data movers can be added to the system to increase throughput without interfering with the operation of the system. The new data movers simply receive work from the index 200 in the same way as the pre-existing data movers, thereby relieving the load on the pre-existing data movers without interrupting their operation. The index 200 immediately knows how to allocate work to new data movers by matching the attributes of available data migration operations to the attributes of the new data movers.

FIG. 1 illustrates the scalability of the data mover layer. The figure shows available migration operations with specific attributes, and the scaling of data movers in line with optimizing aggregate data transfer bandwidth and reducing total duration. The solution of the embodiment ensures that the data mobility layer always exceeds the aggregate bandwidth capability of the source environment, meaning that the data mobility layer is never the bottleneck to data movement operations. Data movers can be adjusted to different identities as required. Data movers can also be dynamically added and removed as required. This allows scaling of the migration capability as discussed above.

Figure 2:
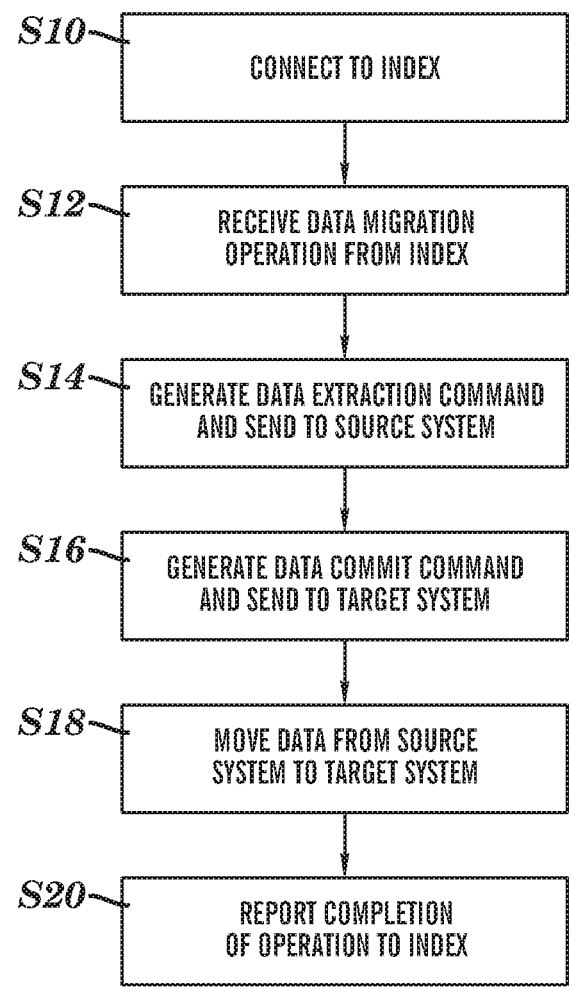
FIG. 2 is a flow diagram showing the operation of a data mover to perform a data migration operation in an embodiment of the invention.
Figure 3:
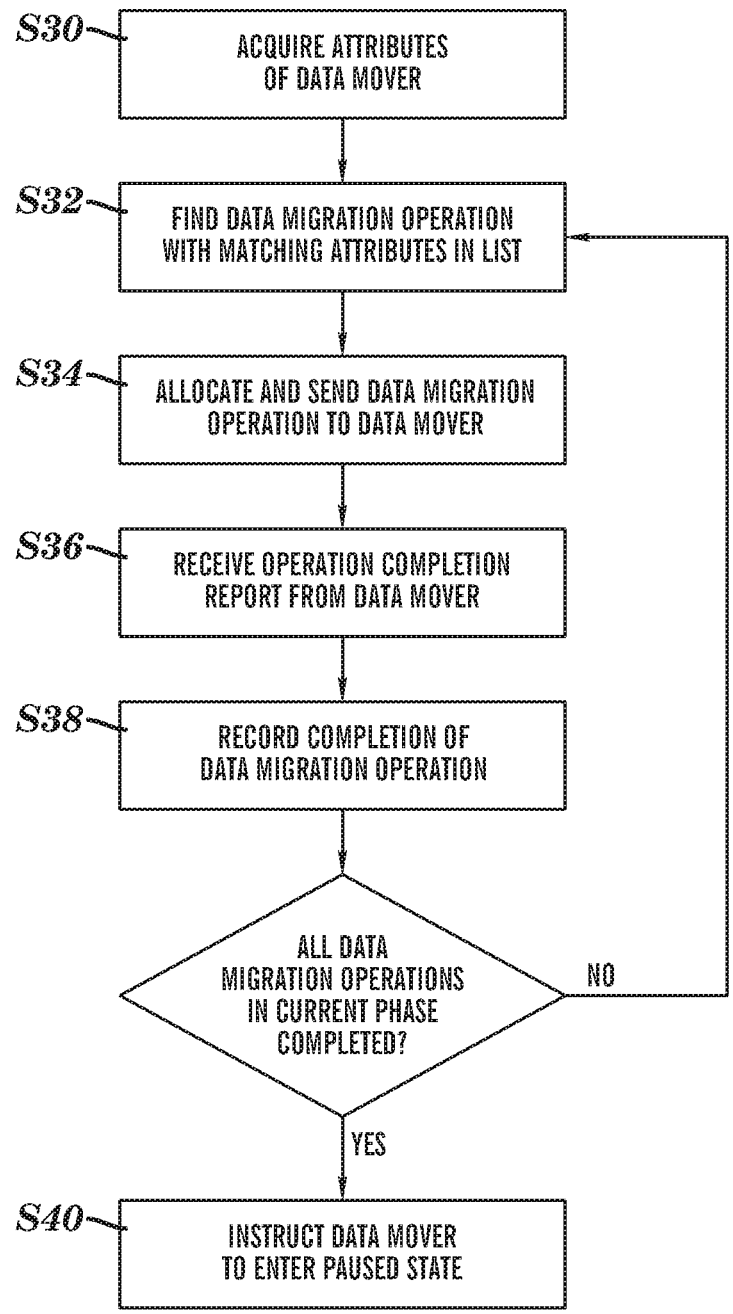
FIG. 3 is a flow diagram showing the operation of the index to perform a data migration operation in an embodiment of the invention.

A process of data migration according to an embodiment of the invention is described below and is illustrated in FIGS. 2 and 3. FIG. 2 shows the operations of the data mover 100, whereas FIG. 3 shows the operations of the index 200.

Once the migration operation setup and configuration on the central index has been completed, a workload list is available for migration operations. All eligible data is packaged into a normalized workload list of required operations. Once this list is complete, then the data movers can be configured and started.

After the data movers have connected to the central index at step S10, their attributes are defined and checked against the attributes of each data migration operation on the workload list at steps S30 and S32. The data mover can be switched on, i.e. its data migration functions are activated, and when this is completed the appropriate workload, i.e. a data migration operation, will be allocated to the data mover at step S34. The workload is received by the data mover at step S12. This workload is essentially a list of the data objects residing in the source server, provided by the index in the normalized language of the index. The data mover then translates this normalized content into the extraction command for the source environment and the commit command for the target environment at steps S14 and S16. The data mover then orchestrates the process of moving data according to the extraction and commit commands at step S18 and reports back to the central index so that a central log of the operation is retained.

Once the migration operation is complete, the data mover reports completion of the data migration operation to the index at step S20. The index receives the operation completion report from the data mover at step S36 and records completion of the operation at step S38.

The data mover will progress to all other operations within the specific phase of migration if any such operations remain. Provided that not all data migration operations in the current phase have been completed, the index returns to step S32 and allocates more work to the data mover. Once all data migration operations in the current phase are complete the index instructs the data mover to move into a paused state at step S40, as the data mover is waiting to acquire the next eligible migration operation. This ensures the central index is updated as to the status of every migration object stored in the source environment. Operations can be tracked and rerun if required throughout the migration program.

Figure 4:
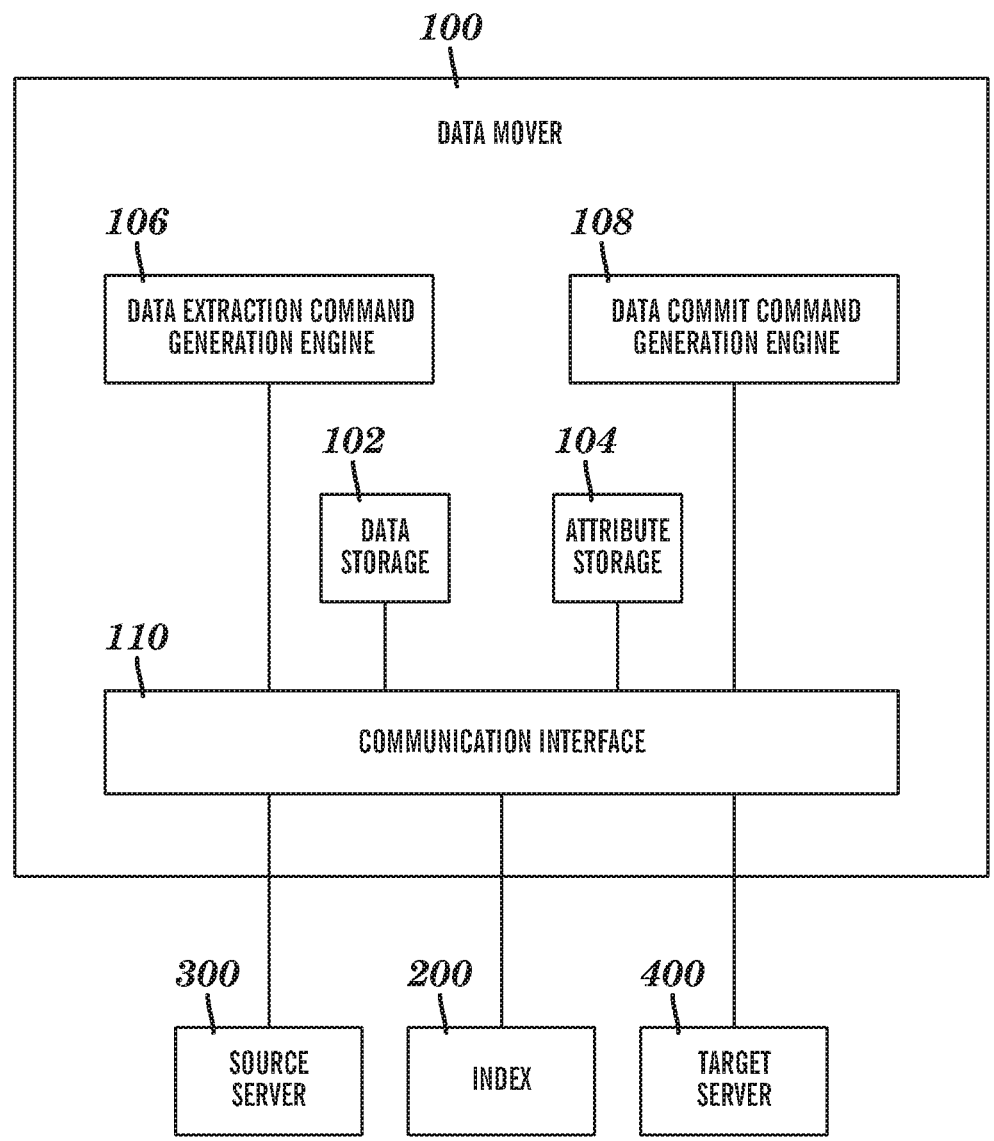
FIG. 4 is a schematic diagram showing the main components of the data mover.

FIG. 4 shows the main components of the data mover 100. The communication interface 110 communicates with the source server 300, the target server 400 and the index 200. The data extraction command generation engine 106 generates the data extraction command in the language of the source server 300 based on a data migration operation received from the index 200 via the communication interface 110. The data commit command generation engine 108 generates the data commit command in the language of the target server 400 based on the data migration operation received from the index 200.

The data storage 102 stores data being moved between the source server 300 and the target server 400. The attribute storage 104 stores the attributes of the data mover 100 that are compared to attributes of the data migration operations in the index 200.

Additional data movers can be started at any point to increase the migration streams and the aggregate available mobility bandwidth. In addition data movers can be removed from the active configuration once they have returned to the pause state after the completion of a migration operation. These operations can be scheduled from the central index 200, ensuring that the data movers can be dynamically enabled and disabled based on policy.

In one embodiment, the data migration system estimates the time required to complete the movement of all data involved in the current data migration from the source server 300 to the target server 400. This may be achieved by obtaining the average rate of data transfer from the start of the data migration through each data mover 100 from the data movers, and adding these average throughputs to obtain the total average throughput of the data migration system. Dividing the volume of data that remains to be migrated by the total average throughput then yields the estimated time to completion.

The data migration system compares the estimated time to completion with a desired time to completion for the data migration, which is input to the system in advance. If the estimated time to completion is higher than the desired time then the system activates currently deactivated data movers or connects additional data movers to the system. This increases the overall rate of data transfer and ensures timely completion of the migration.

Conversely, if the estimated time to completion is less than the desired time by more than a present amount, the system deactivates one or more data movers or disconnects one or more data movers from the index. This conserves power and system resources when they are not required.

In the above embodiment, the index 200 may send a request for attributes to a data mover 100 and the data mover 100 may transmit its attributes to the index 200 in response to the request. However, it is also possible for the data mover 100 to transmit its attributes to the index 200 unprompted on connection to the index 200 or at regular intervals. The index 200 may also store a list of all data movers 100 connected to the index and their attributes.

In the above embodiment the index 200 allocates and sends data migration operations to the data movers 100. However, the index 200 may first wait for a work request to be sent from a data mover 100 before allocating a data migration operation to that data mover 100.

The above method allows the flexible capability for large scale data mobility to be scaled to the size and capability of any source infrastructure. This flexible style of grid based data movement means that larger volumes of data having more complex data types and platforms can be migrated than was possible in the prior art. The number of data movers used in the invention is not limited and can be selected freely in line with the size and planned duration of the migration project.

The design of the system according to this embodiment allows a single central index or repository to hold all associated metadata for the migration project. This allows a single point of management and control for the management of all data movers.

In this embodiment, the data mover interacts with a client module for the source and target software. This allows the application of the process to other applications requiring scalable data mobility. Possible applications of the invention include providing indexed backup/archiving of data content, the migration of large scale physical-virtual server environments, and the mobility of storage assets to more modern technology.

Figure 5:
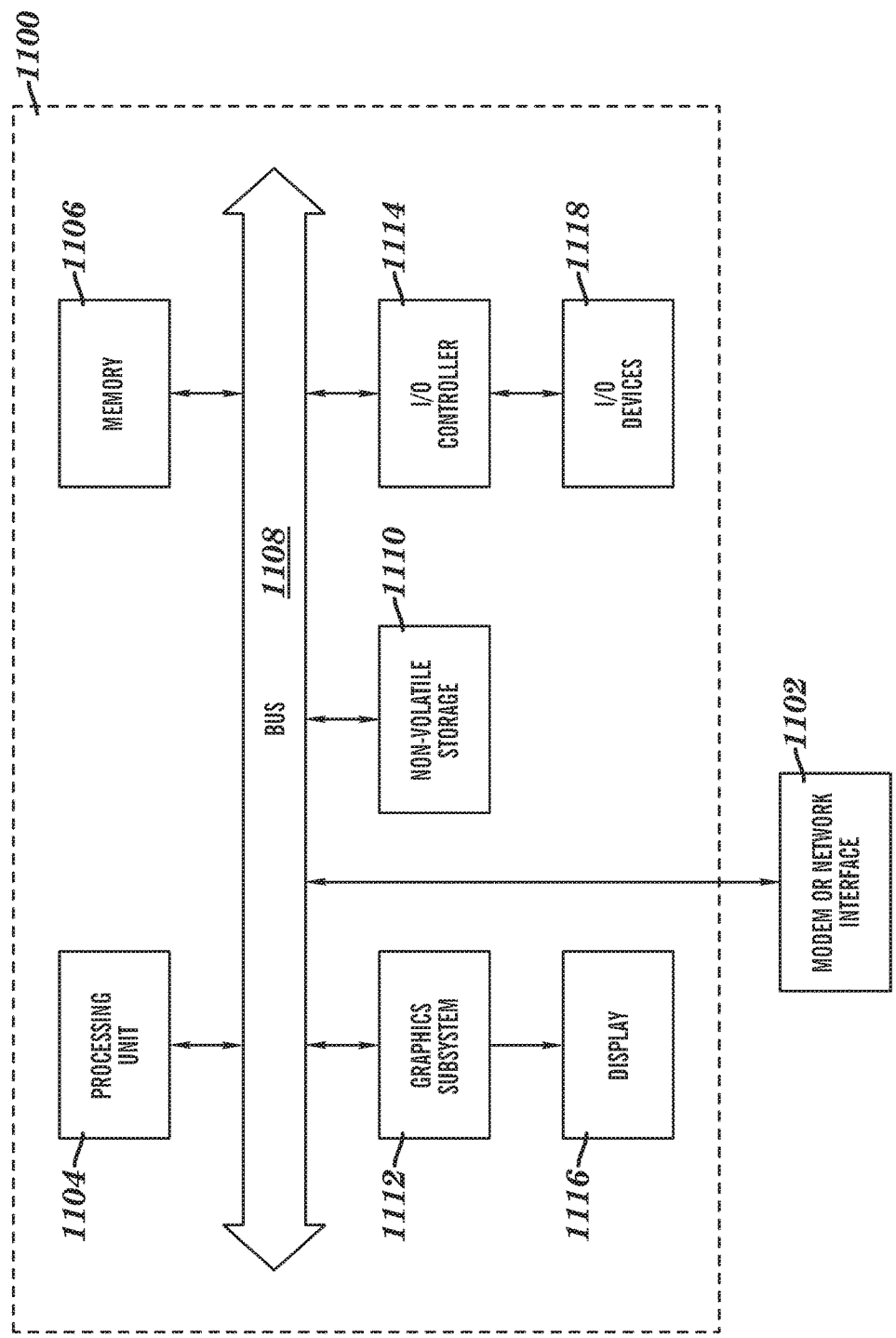
FIG. 5 illustrates an exemplary computer architecture 1100 on which the data migration system of the invention can be implemented.

FIG. 5 illustrates an exemplary computer architecture 1100 by which the data migration system and in particular an index or a data mover according to the invention may be implemented. Computer architecture 1100 may be or form part of a desktop computer or a laptop computer, a server or any similar computer device, but the index is preferably implemented as a stand alone server.

The computer architecture 1100 may interface to external devices such as the source server 300 or the target server 400 through a modem or network interface 1102, such as an analogue modem, ISDN modem, cable modem, token ring interface, or satellite transmission interface. As shown in FIG. 5, the computer architecture 1100 includes a processing unit 1104, which may be a conventional microprocessor, such as an Intel Pentium microprocessor, an Intel Core Duo microprocessor, or a Motorola Power PC microprocessor, which are known to one of ordinary skill in the computer art. System memory 1106 is coupled to the processing unit 1104 by a system bus 1108. System memory 1106 may be a DRAM, RAM, static RAM (SRAM) or any combination thereof. Bus 1108 couples processing unit 1104 to system memory 1106, to non-volatile storage 1110, to graphics subsystem 1112 and to input/output (I/O) controller 1114. Graphics subsystem 1112 controls a display device 1116, such as a liquid crystal display, which may be part of the graphics subsystem 1112. The I/O devices 1118 may include one or more of a keyboard, disk drives, printers, a mouse, a touch screen and the like as known to one of ordinary skill in the computer art.

The index or data mover control software will normally be stored on the non-volatile storage 1110. Thus, it may be stored on the machine's hard drive, or possibly on an externally connectable storage medium, such as a USB memory stick or a CD. These two devices would then constitute part of the I/O devices shown as item 1118 in FIG. 5. The non-volatile storage may also store indexing data forming part of the index.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for migrating data from a source server to a target server, the method comprising:
   storing a set of data migration operations in a normalized data model in a single index, each data migration operation being stored in association with an attribute;
   storing an attribute profile in a data mover communicably connected to the single index, the attribute profile indicating the type of data migration operations that are performed by the data mover;
   acquiring, by the single index, the attribute profile stored in the data mover;
   transmitting, from the single index to the data mover, a data migration operation from the set of data migration operations stored in the single index, wherein the attribute profile of the data mover matches an attribute of the transmitted data migration operation; and
   migrating data from the source server to the target server based on the transmitted data migration operation.

2. The method according to claim 1, wherein a plurality of data movers having different attributes are connected to the single index.

3. The method according to claim 1, further comprising:
   estimating the time required to complete migration of the data from the source server to the target server; and
   connecting an additional data mover to the single index or activating an additional data mover if the estimated time exceeds a predetermined upper threshold.

4. The method according to claim 1, further comprising:
estimating the time required to complete migration of the data from the source server to the target server; and
disconnecting a data mover from the single index or deactivating a data mover if the estimated time falls below a predetermined lower threshold.

5. The method according to claim 1, wherein the single index further comprises an index of the data on the source server.

6. The method according to claim 1, wherein the attribute of the data migration operation comprises a source location, a target destination, a platform type, a data type, or some combination thereof.

7. The method according to claim 1, wherein the attribute profile of the data mover comprises a source location, a target destination, a platform type, a data type, or some combination thereof.

8. A method for migrating data from a source server to a target server, the method comprising:
storing a set of data migration operations in a normalized data model in a central index, each data migration operation being stored in association with one or more attributes;
acquiring, by the central index, an attribute profile of one of a plurality of data movers communicably connected to the central index;
transmitting a data migration operation from the set of data migration operations stored in the central index to one of the plurality of data movers having an attribute profile matching the one or more attributes of the data migration operation; and
migrating data from the source server to the target server based on the transmitted data migration operation.

9. The method according to claim 8, further comprising:
estimating the time required to complete migrating of the data from the source server to the target server; and
connecting an additional data mover to the central index based on a comparison between the estimated time required to complete movement of the data and a predetermined threshold.

10. The method according to claim 8, further comprising:
estimating the time required to complete migrating of the data from the source server to the target server; and
activating an additional data mover to the central index based on a comparison between the estimated time required to complete movement of the data and a predetermined threshold.

11. The method according to claim 8, further comprising:
estimating the time required to complete migrating of the data from the source server to the target server; and
disconnecting a data mover from the central index based on a comparison between the estimated time required to complete movement of the data and a predetermined threshold.

12. The method according to claim 8, further comprising:
estimating the time required to complete migrating of the data from the source server to the target server; and
deactivating a data mover from the central index based on a comparison between the estimated time required to complete movement of the data and a predetermined threshold.

13. The method according to claim 8, wherein the central index further comprises an index of the data on the source server.

14. The method according to claim 8, wherein the one or more attributes of the data migration operation and the attribute profile of the data mover comprises a source location, a target destination, a platform type, a data type, or some combination thereof.

* * * * *